United States Patent

[11] 3,586,338

| [72] | Inventors | Ernest P. Miklau;<br>John R. Crowe, both of Hagerstown, Md. |
|---|---|---|
| [21] | Appl. No. | 829,030 |
| [22] | Filed | May 29, 1969 |
| [45] | Patented | June 22, 1971 |
| [73] | Assignee | Mack Trucks, Inc.<br>Allentown, Pa. |

[54] COMBUSTION SEAL FOR ENGINES
14 Claims, 3 Drawing Figs.

[52] U.S. Cl.............................................. 277/1,
277/235 B
[51] Int. Cl.......................................... F16j 15/04
[50] Field of Search........................... 277/235,
235 B, 236, 1

[56] References Cited
UNITED STATES PATENTS
2,679,241   5/1954   Dickson .................. 277/235 (B)

FOREIGN PATENTS
829,842   7/1949   Germany .................. 277/235 (B)
366,691   1/1959   Switzerland ............. 277/235 (B)

Primary Examiner—Laverne D. Geiger
Assistant Examiner—Robert I. Smith
Attorney—Brumbaugh, Graves, Donohue & Raymond ABSTRACT: To provide a durable seal for combustion gases, a cylinder sleeve (or block) is formed with an annular bead preferably chamfered on its outer edge and a cylinder head is formed with an annular groove. A fire ring made of a deformable metal is placed on top of the bead so that when the cylinder head is clamped to the block, the fire ring is extruded by the bead on the cylinder sleeve (or block) into the groove on the cylinder head. A separate gasket body provided in the block to head joint provides a seal for the coolant and oil passages therebetween.

INVENTORS.
ERNEST P. MIKLAU &
JOHN R. CROWE
BY
their ATTORNEYS

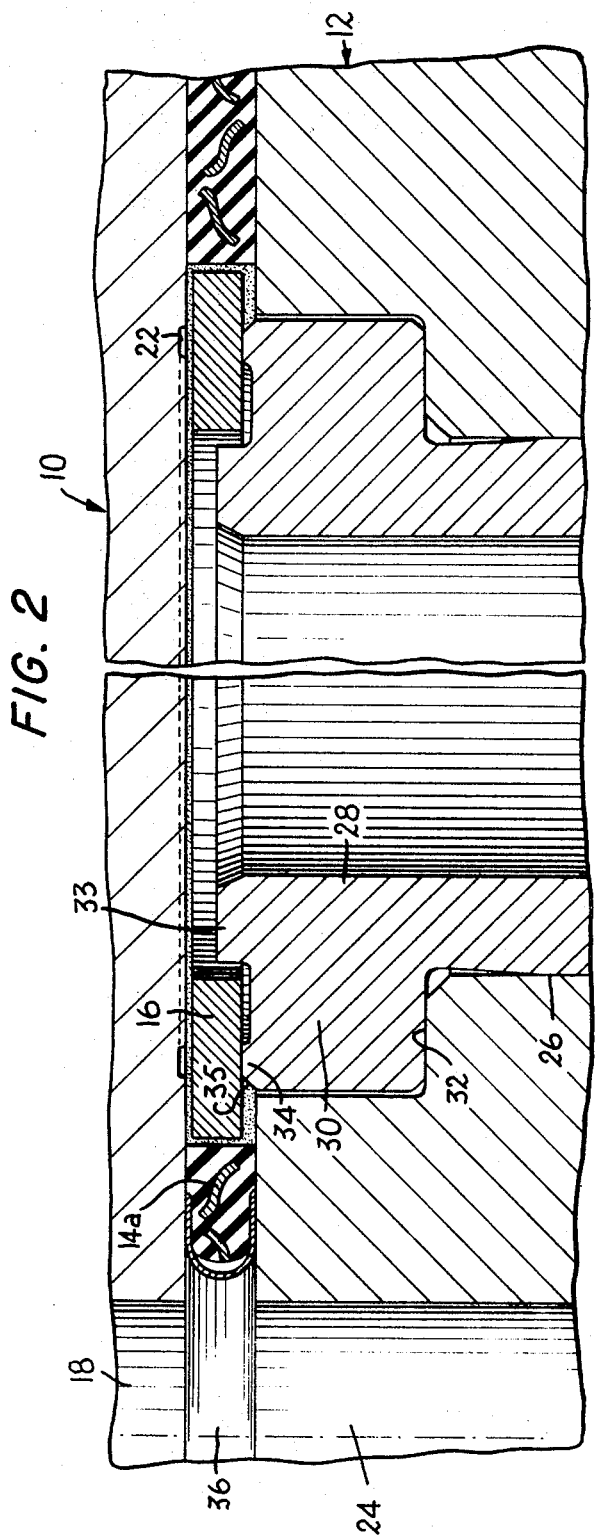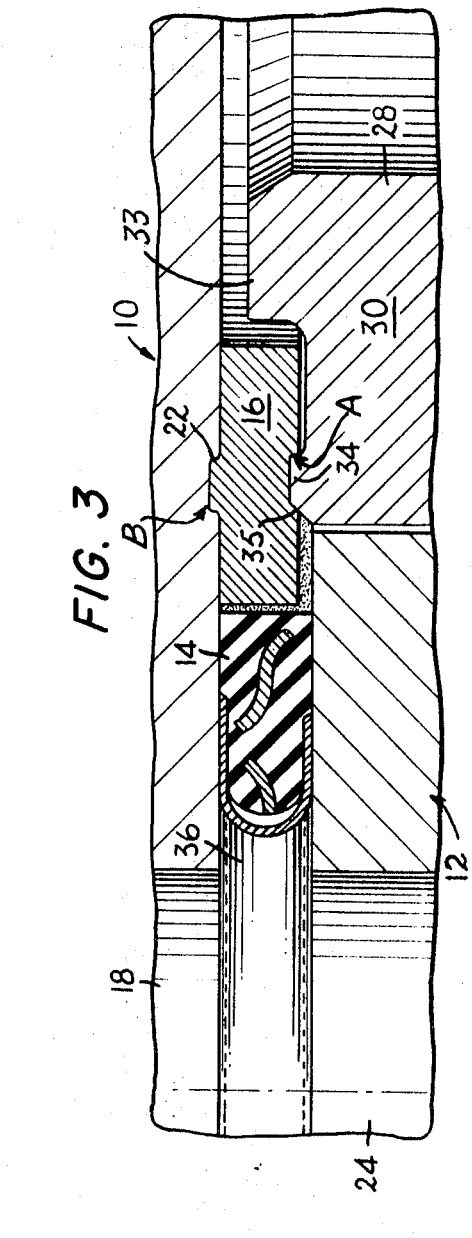

COMBUSTION SEAL FOR ENGINES

This invention relates to a blockhead combustion seal for internal combustion engines and, in particular, to a seal capable of withstanding high pressures and temperatures over extended operating periods.

In modern internal combustion engines it is possible to develop peak pressures on the order of 2,000 p.s.i.g. in each cylinder. With these high pressures there is a serious problem in forming an effective and long-lasting combustion seal between the cylinder block and head. The seal must be capable not only of withstanding the high cyclic pressures in the cylinder but also of withstanding high combustion temperatures for extending periods of operation. Ideally this seal should also be economical to manufacture.

Prior to this invention, cylinder head gasket designs often consisted of a compressible combustion seal integral with or similar to the gasket body used to seal other headblock passages. The internal pressures that such gaskets could retain was limited by the available clamping force, friction of the mating parts, and backup support offered by the material surrounding the compressible gasket. In addition to pressure limitations and limited life expectancy, the prior combustion seals and body gaskets continued to compress, not necessarily at the same rate, throughout their life. This required periodic retorquing of the heads and other additional maintenance expense for the engine.

An attempted solution to this problem, prior to the present invention, involved the use of incompressible material such as steel sheets that were formed prior to assembly to provide a seal. Such designs proved very costly since they required close manufacturing tolerances in order to be capable of sealing high combustion pressures. In addition to their cost, such gaskets had unsatisfactory coolant and lubricant seals and, therefore, did not satisfy the long life expectancy required for economical maintenance of the engine.

In another attempt to solve these problems, a bead was provided on the cylinder liner and a series of relatively narrow and shallow scratches or serrations separated by flats was provided on the bottom face of the head. Looked at in cross section, this scratch-flat configuration resembled a sawtooth. A ring of deformable material was placed between the bead and scratches and when the head was torqued down, the scratches frictionally gripped the ring. A problem with this design was that because of the flats, the unit loads developed at the scratch-ring interface was relatively low and would not withstand the cyclic pressures developed in the cylinder for satisfactory periods of time. Also, because the interior surfaces of the scratches sloped divergently outwards and the scratches were not wide enough to permit the seal ring to flow sufficiently therein, a positive interlock was not obtained between the head and the seal ring. Furthermore, this construction promoted slippage at the ring-scratch interface due to the relative movement caused by the large temperature differential between the head and liner. Accordingly, this technique was abandoned.

This invention overcomes the foregoing problems by providing a fire ring seal, separate from but, in part, located by a gasket body, that is made of a deformable metal. The cylinder sleeve is provided with an annular bead which is preferably chamfered on its outer edge and the cylinder head is provided with an annular groove, so that upon torquing of the nuts on the studs to clamp the cylinder head to the block, the bead extrudes the fire ring into the groove, thereby interlocking the ring with the sleeve and head and effectively sealing the combustion chamber. The gasket body is also compressed to seal the coolant and oil passages.

For a better understanding of the invention, reference may be made to the following description of an exemplary embodiment of the invention, taken in conjunction with the figures of the accompanying drawings, in which;

FIG. 2 is a greatly enlarged cross-sectional view of the cylinder head and block assembly shown in FIG. 1 taken along the line 2-2 looking in the direction of the arrows and showing the combustion chamber seal prior to torquing; and FIG. 3 is an enlarged cross-sectional view, similar to FIG. 2, but showing the assembly after the head has been torqued to the block.

Figure 1:
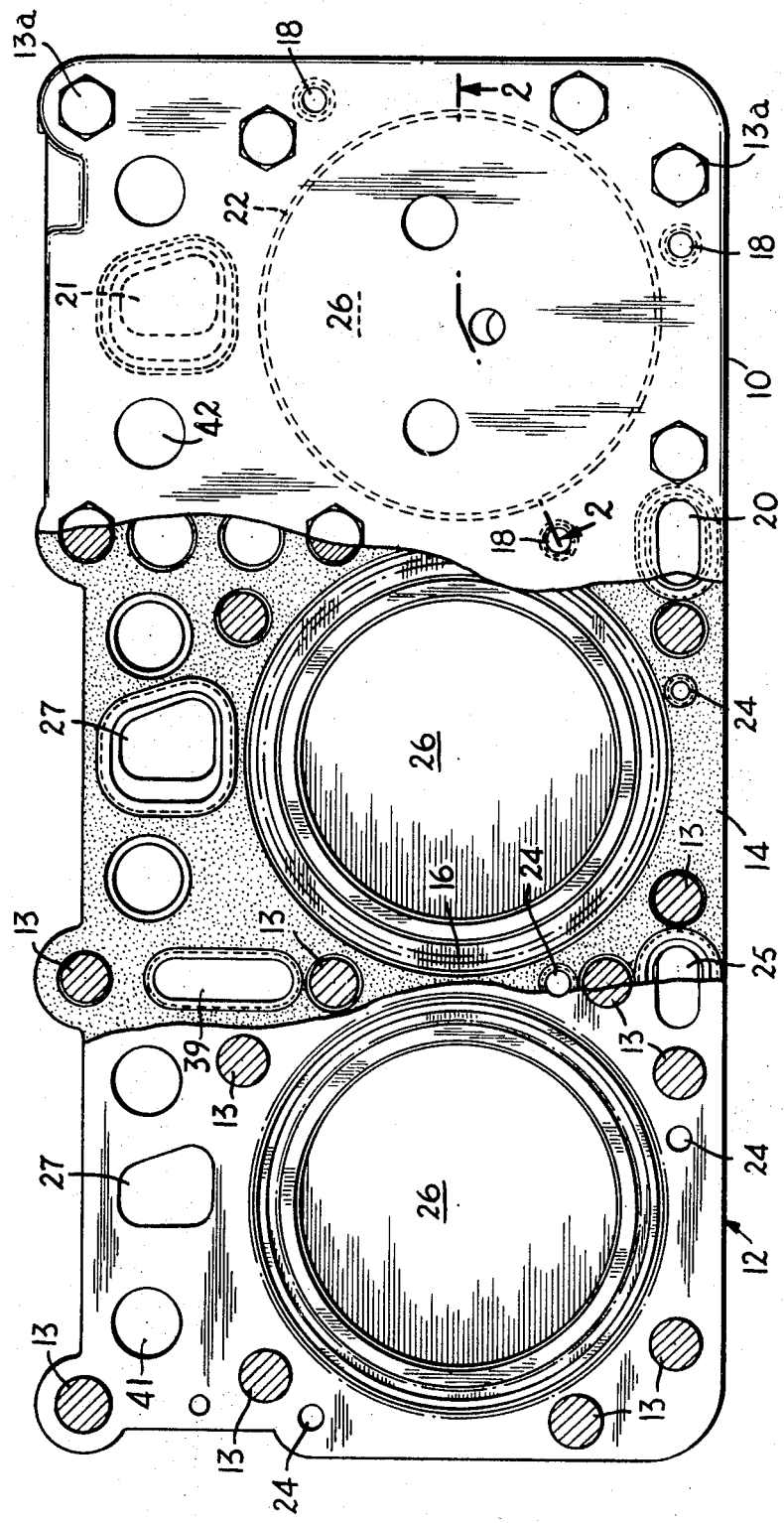
FIG. 1 is a partially broken away plan view of a cylinder head and block assembly embodying a combustion seal according to the present invention.

Referring more specifically to the drawings, in FIG. 1 there is shown a cylinder head 10 secured to a cylinder block 12 by a plurality of studs 13 and nuts 13a. Mounted between the head and the block is a gasket body 14 having openings therein for the studs 13, cylinders 26, and coolant and lubricant passages. A fire ring 16, located around the periphery of each cylinder provides a combustion seal for the combustion gases.

Since the head and block of automotive engines are complex structures, only those portions necessary for a proper understanding of this invention are described herein. The head 10, in plan view, is a generally rectangular member having openings for receiving the studs 13 and further circular openings 18, oval openings 20, and trapezoidal-shaped openings 21 for the passage of coolant. As can best be seen in FIGS. 2 and 3, the lower face of the head is provided with an annular groove 22 above the periphery of each of the cylinders 26 in the block. The purpose of this groove will be more fully explained hereinafter.

The block 12 is also a generally rectangular member and is provided with a plurality of studs 13. Circular openings 24, oval openings 25, and trapezoidal-shaped openings 27 are provided through the block and cooperate with openings 18, 20, and 21 in the head to form the coolant passages. Oblong openings 39 and circular openings 41 are formed in the block and cooperate with oblong openings (not shown) and circular openings 42 formed in the head to provide lubricant passages through the engine. The circular openings 41 and 42 also provide holes for the pushrods (not shown). A plurality of openings 26 in the block provide cylinders in which the air-fuel mixture is ignited. These cylinders may be of any suitable construction, for example, the dry type, which have thin sleeves (sometimes called liners) lining their inner peripheries, or the wet type, which have thicker sleeves that are in actual contact with the coolant. In this embodiment, and for purposes of illustration, a dry-type sleeve is disclosed.

A sleeve 28, formed with a flange 30 around its upper end, is seated in the block 12 with the flange engaging a shoulder 32 formed at the upper end of the cylinder opening 26. Located at the upper end of the sleeve 28 and projecting above the flange 30 is a fire dam 33 that cooperates with the gasket body 14 in locating the fire ring 16. A bead 34 on the upper face of the flange 30 is chamfered along its outer lateral face as shown at 35 in FIGS. 2 and 3 of the drawings. It is to be understood, of course, that a sleeve need not be used and the bead 34 could be formed directly on the block 12.

The fire ring 16 is made of a deformable metal, e.g., certain types of steel, to seal the cylinder. In use, the flat fire ring 16 (see FIG. 2) is seated on the bead 34 and beneath the groove 22 so that upon clamping of the head 10 to the block 12 by tightening the nuts 13a on the studs 13, a small section of the ring is extruded into the matching groove 22, which is of equal or smaller volume than the bead 34, to provide an interlocking relationship (see FIG. 3). Similarly, the bead 34 deforms a groove in the ring 16 and seats therein in interlocking relationship.

Preferably, the groove 22 and bead 34 are in vertical alignment and have substantially the same width. The depth of the groove is sufficient to establish a good interlock, but is preferably less than the height of the bead above the adjacent horizontal surface of the flange 30, so that the extruded portion of the ring completely fills the groove. Alternatively, the groove could be cut deeper than necessary and the extruded portion of the ring only fill it to a depth sufficient to establish the desired interlock.

As pointed out previously, the gasket body 14, which is used to help locate the fire ring 16, is a separate unit made of compressed asbestos with a nitrile rubber binder having a steel core 14a, which may be a steel sheet with perforations punched through it. The gasket is shaped to conform with the mating faces of the head and the block. As can best be seen in FIGS. 2 and 3, the periphery of the gasket around each of the coolant and oil passages contains a grommet 36 to improve the sealing by increasing the unit pressure on the gasket body in these areas and to prevent direct contact of the coolant with the gasket body. Contact of the coolant with the gasket body would cause degradation of the latter and result in a shorter life. These grommets 36 can be made out of copper or stainless steel, for example, with the latter being preferred because of its longer life.

In assembling the seal, the gasket body 14 is first placed on top of the block 12 and the fire rings 16 are then inserted on the beads 34 of the cylinder sleeves and are located thereon by the gasket body and the fire dams 33. After positioning the head 10 on top of the block 12, the nuts 13a are torqued down on the studs 13 to clamp the head to the block and coin a land on the fire ring which is received in the mating groove 22, as seen in FIG. 3. During the coining process, the bead 34 coins a mating groove in the ring and is received therein.

The chamfer face 35 on the bead 34, although not essential to achievement of the combustion seal, has been found to prevent vertical cracking of both the fire ring 16 and the flange 30, cracking of the latter otherwise occurring at the base of the bead radially inward thereof. Although the reason for this is not clearly understood, it is assumed that the material comprising the chamfer provides a buttressing effect on the bead. This feature thus greatly increases the life of the ring and the cylinder sleeve.

It is clear from the preceding description that the deformation of the fire ring when the head is clamped to the block results in high unit loads at the edges of the bead 34 and the groove 22, thereby resulting in a combustion seal capable of withstanding high combustion pressures and temperatures over extended periods of operation. Moreover, the arrangement is in effect self-sealing, since the pressure of the fire ring on the inner face of the bead, at A, and the outer face of the groove, at B, increases with increased combustion pressure. Since the ring is deformed during torquing of the studs, there is no need for extremely close tolerances in machining the sleeve flange and block counterbore dimensions. Thus, the bead on the sleeve flange will compensate for reasonable variations in the flange height above the block that may exist in one cylinder or between cylinders. In addition, no retorquing is required for the coined combustion seal according to the present invention, as contrasted with conventional combustion seals.

While a preferred embodiment of the invention has been described, various modifications will become apparent to those skilled in the art without departing from the spirit of the invention. Accordingly, it is not desired to limit the invention to the embodiment disclosed herein.

We claim:

1. A combustion seal for each cylinder of an engine including a cylinder block and cylinder head comprising an annular bead on the block adjacent the periphery of the cylinder opening, an annular groove on the head having about the same diameter as the bead and a deformable metal ring disposed between the bead and groove and extending beyond the edges of the groove so that clamping the head to the block causes the bead to extrude a portion of the ring into the groove to form a positive interlocking therewith and also causes the bead to form a groove in the ring for receiving the bead therein.

2. A combustion seal as defined in claim 1, wherein the outer lateral surface of the bead is chamfered.

3. A combustion seal for each cylinder of an engine including a cylinder block and a cylinder head comprising an annular bead on the outer surface of a sleeve received in the cylinder, an annular groove in the head having about the same diameter as the bead and a deformable metal ring disposed between the bead and groove and extending beyond the edges of the groove so that clamping the head to the block causes the bead to extrude a portion of the ring into the groove to form a positive interlock therewith.

4. A combustion seal as defined in claim 3, wherein the clamping of the head to the block also causes the bead to form a groove in the ring for receiving the bead therein.

5. A combustion seal as defined in claim 4, wherein the groove and the bead are shaped to maximize the unit loads at the edges of the bead and the groove.

6. A combustion seal as defined in claim 4, wherein the outer lateral surface of the bead is chamfered.

7. A combustion seal as defined in claim 3, including a gasket body between the block and head for sealing coolant and lubricant flowing therebetween having a plurality of openings for the passage of coolant and lubricant between the block and the head, each coolant opening being defined by grommet means mounted on the edge of the gasket body surrounding the coolant opening for increasing the unit pressure on the gasket body when the head is clamped to the body.

8. A combustion seal as defined in claim 3, wherein the extruded portion of the ring substantially fills the groove.

9. A combustion seal for each cylinder of an engine including a cylinder block and a cylinder head comprising an annular bead on the outer surface of a sleeve received in the cylinder, an annular groove in the head having about the same diameter as the bead, a deformable metal ring disposed between the bead and groove and extending beyond the edges of the groove, and means for clamping the head to the block and for extruding a portion of the ring into the groove to form a positive interlock therewith.

10. A combustion seal as defined in claim 9, wherein the clamping and extruding means comprises a plurality of threaded elements for torquing the head to the block.

11. A combustion seal as defined in claim 9, wherein the means for clamping the head to the block also forces the bead into the ring forming a groove in which the bead is imbedded.

12. A combustion seal as defined in claim 9, wherein the outer lateral surface of the bead is shaped so as to buttress the bead against forces urging it radially outwardly.

13. A combustion seal for each cylinder of an engine including a cylinder block and a cylinder head comprising an annular bead on the outer surface of a sleeve received in the cylinder, an annular groove in the head having about the same diameter as the bead, and a metal sealing ring disposed between the bead and the groove and extending beyond the edges of the groove, the sealing ring having a coined land which mates with the groove in the head and a coined groove which mates with the bead, the land and the groove being coined in the sealing ring as the head is torqued to the block.

14. A method of sealing the cylinder of an engine comprising the steps of providing an annular bead on the outer surface of a sleeve received in the cylinder, forming a groove in the head of about the same diameter as the bead, placing a deformable ring on the bead, imbedding the bead into the ring, and extruding a section of the ring into the groove.